ns Patent [19]

Liu et al.

[11] 3,852,425
[45] Dec. 3, 1974

[54] MITOCROMIN AND PROCESS FOR PREPARING SAME

[75] Inventors: Wen-Chih Liu, Paramus; Koppaka V. Rao, Pine Brook, both of N.J.

[73] Assignee: Pfizer & Co., Inc., New York, N.Y.

[22] Filed: Nov. 27, 1968

[21] Appl. No.: 779,464

[52] U.S. Cl. .................................. 44/119, 195/80
[51] Int. Cl. .................................. A61k 21/00
[58] Field of Search ..................... 424/119; 195/80

[56] References Cited
FOREIGN PATENTS OR APPLICATIONS
985,598  3/1965  Great Britain .................. 424/119

Primary Examiner—Jerome D. Goldberg
Attorney, Agent, or Firm—Connolly and Hutz

[57] ABSTRACT

The novel antibiotic, and complexing agents B-35251A, B-35251B, and B-35251C, the known antibiotic daunomycin, mixtures of these various substances — especially that comprising B-35251A and B-35251B and known as mitocromin; their microbiological production by a new strain of *Streptomyces viridochromogenes*, by *Streptomyces griseo-laqueus*, a new species of *Streptomyces*, and by *Streptomyces sp.* ATCC 21345, and methods for their recovery, concentration, isolation, and purification are described.

2 Claims, 1 Drawing Figure

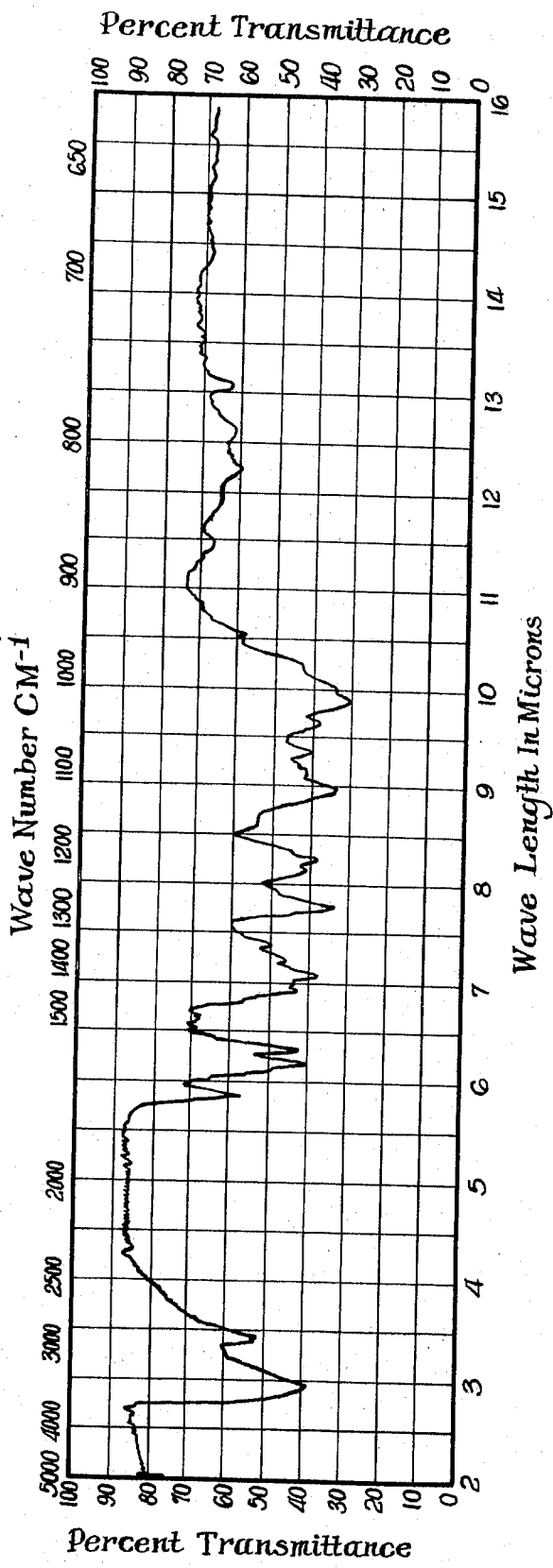

MITOCROMIN AND PROCESS FOR PREPARING SAME

The invention described herein was made in the course of, or under, a contract with the Department of Health, Education and Welfare.

BACKGROUND OF THE INVENTION

This invention relates to the new and useful fermentation products B-35251A, B-35251B, and B-35251C, respectively, and to the acid addition salts thereof; to their production and that of the known antibiotic daunomycin by the cultivation of the microorganisms *Streptomyces viridochromogenes* ATCC 21343, *Streptomyces griseo-laqueus* ATCC 21344, and *Streptomyces* sp. ATCC 21345, and to methods for their recovery, concentration, separation, and purification from crude solutions, including fermentation broths.

This invention relates specifically to new and useful fermentation products called antibiotics B-35251A, B-35251B, and B-35251C in their crude and purified forms, to a process for their preparation by fermentation, and to methods for their recovery, concentration, isolation, and purification. These products are useful against Walker 256 carcinosarcoma in rats and against leukemia P-388 in mice. As antibiotic agents they are especially useful for a number of applications in therapeutics, veterinary medicine, industry, and agriculture. They are also useful as complexing agents for polyvalent metal ions, especially for the transition metal ions, such as copper, cobalt, nickel, magnanese, zinc, cadmium, and magnesium. They are, therefore, useful for the removal of polyvalent ions in biological experimentation and in analytical procedures. It further includes the production of daunomycin by the above-named organisms and methods for its recovery, concentration, isolation, and purification.

Various strains of *Streptomyces viridochromogenes* are known to produce a glucosidic, antibiotic substance, chartreusin, Grein et al., Giorn. Microbiol. 1, 316-322 (1955-56). The production of daunomycin by *Streptomyces peucetius* is reported by Cassinelli et al., Giorn. Microbiol. 11, 167-174 (1963).

SUMMARY OF THE INVENTION

The products B-35251A, B-35251B, B-35251C, and daunomycin, all of which are basic substances, are formed during the cultivation under controlled conditions of a new strain of *Streptomyces viridochromogenes* or of a new species of Streptomyces, *Streptomyces griseo-laqueus*. The new strain of S. viridochromogenes was isolated from a soil sample obtained from Ghana. The new species *S. griseo-laqueus* was isolated from a soil sample obtained from India. These cultures are identified in the culture collection of Chas. Pfizer & Co., Inc. as Isolates B-35251 and B-105621, respectively.

Classification of this new strain of *S. viridochromogenes* was made by Dr. John B. Routien. Isolate B-35251 was examined and found to be a streptomycete. It was plated on various media used for identification of members of the genus Streptomyces, and records of results taken at various times were made. Time of incubation was up to two weeks except where otherwise noted and temperature of incubation was 28° C. Planting was done by loop from a suspension of spores of the culture washed from a slant. The capitalized color designations are those of Ridgway.

The organism was identified as *Streptomyces viridochromogenes sensu* Huetter (Archiv. fuer Mikrobiologie 43:23-49, 1962).

The description of the organism is as follows:

Synthetic Agar: Growth excellent; aerial mycelium scant, pale whitish gray; substrate mycelium Orange Vinaceous to Etruscan Red; reverse near Old Rose; very pale pinkish tan soluble pigment.

Glucose Asparagine Agar: Growth good; aerial mycelium well developed, near Pale Caerulean Blue; reverse Light Grayish Vinaceous; soluble pigment lacking; earthy odor.

Nutrient Agar: Growth moderate; scant, white aerial mycelium; reverse white; pale brown soluble pigment.

Emerson's Agar: Growth moderate, somewhat flat; aerial mycelium moderate, Haiti Gray; reverse near Ochraceous Buff; soluble pigment light brown; earthy odor.

Gelation: Growth good, flat; aerial mycelium moderate, pale grayish white; reverse light pinkish white; soluble pigment lacking; good liquefaction.

Calcium Malate: Growth moderate; aerial mycelium moderate, Light Celandine Green; reverse Light Vinaceous Gray; soluble pigment lacking; malate digested.

Skimmed Milk: Growth moderate as a brownish to brownish-vinaceous ring; no coagulation by 10 days; partial but slight hydrolysis by 10 days; soluble pigment brownish black (Benzo Brown) in 10 days; pH essentially unchanged.

Casein Agar: Growth excellent; soluble pigment Brownish Drab; casein digested.

Tyrosine Agar: Growth good; soluble pigment dark brown; tyrosine digested.

Starch Agar: Growth moderate; aerial mycelium scant, white; reverse white; soluble pigment lacking; slight hydrolysis.

Potato Plugs: Growth moderate; aerial mycelium lacking; vegetative mycelium near Livid Brown; soluble pigment dark brown to black.

Nitrate Reduction: Negative even after 14 days in both dextrose nitrate broth and organic nitrate broth.

$H_2S$ production (peptone iron agar plus lead acetate strips): Positive.

Cellulose Strips: Thin, diffuse growth.

Carbon Sources: Utilized: arabinose, fructose, glucose, inositol, lactose, mannitol, raffinose, rhamnose, sucrose, xylose; not utilized: sorbitol.

Spores (on glucose asparagine agar plates): Spores mostly elliptical to narrowly elliptical, 0.8–1.3 × 0.6 $\mu$, with spiny surface by electron micrography; spores in chains borne singly, in pairs or in verticils of three or four branches, chains simple or branched; chains mostly in spirals that were mostly open, but some chains were straight or curved; spirals were of three or four turns as compared with the 10 described by Huetter.

A culture of this new strain of *S. viridochromogenes* has been deposited with the American Type Culture Collection, Washington, D. C., under the number ATCC 21343.

Isolate B-105621 was recognized to be a member of the genus Streptomyces. It was planted on media commonly used for identification of members of this genus and incubated at 28°C. Readings of results were made at appropriate times up to 14 days and recorded.

After several studies, the culture was considered to be most similar to *Streptomyces violaceochromogenes*, *S. violaceorectus*, and *S. viridiviolaceus*. Cultures of these under the ATCC numbers 5181, 5279, and 5280, respectively, and our B-105621 were compared simultaneously on Gauze's Mineral Medium No. 1, Organic Medium No. 2, gelatin, starch agar, nitrate medium as described by Gauze (*Problems in the Classification of Antagonistic Actinomycetes*, trans. F. Danga, English edition edited by D. Gottlieb, American Institute of Biological Sciences, Washington, D. C., 1959) and on cellulose strips and on a medium for sucrose inversion (a salts-peptone medium devised by Vierling and listed in *A Compilation of Culture Media* by M. Levine and H. W. Schoenlein, The Williams & Wilkins Co., 1930).

Though B-105621 showed certain general similarities to *S. violaceorectus*, it clearly was different in several ways. These were so noticeable that our culture can be considered to represent a new species. The name *Streptomyces griseo-laqueus* is proposed for it. The type culture is B-105621. A culture of this new species has been deposited at the American Type Culture Collection in Washington, D. C., under the number ATCC 21344.

In the description below, capitalized color designations are those of Ridgway.

*Streptomyces griseo-laqueus* sp. nov.

Synthetic Agar: Growth moderate; aerial mycelium Mouse Gray; reverse white; no soluble pigment.
Gauze's Medium No. 1: Growth good; aerial mycelium gray; reverse reddish pink; pink soluble pigment.
Nutrient Agar: Growth good; aerial mycelium Light Mouse Gray to Quaker Drab; reverse grayish-brown; no soluble pigment.
Glucose Agar: Growth moderate; aerial mycelium Light Mouse Gray; reverse reddish-brown; no soluble pigment.
Gauze's Medium No. 2: Growth good; aerial mycelium gray; reverse reddish-brown; no soluble pigment.
Glucose Asparagine Agar: Growth poor; aerial mycelium gray; reverse white but pink at edges of streaks; no soluble pigment.
Tomato Paste-Oatmeal Agar: Growth excellent; aerial mycelium Mouse Gray; reverse gray; grayish-red soluble pigment under colony only.
Gelatin: Growth good; aerial mycelium Olive Gray; reverse pale brownish-pink; no soluble pigment; liquefaction.
Starch Agar: Growth moderate; aerial mycelium scant, gray; reverse pale rose; no soluble pigment; very weak hydrolysis.
Gauze's Starch Medium: Growth good; aerial mycelium gray; reverse reddish; soluble pigment faint pink.
Calcium Malate Agar: Growth good; aerial mycelium Deep Olive Gray; reverse lavender; soluble pigment pinkish lavender; malate digested.
Tyrosine Agar: Growth good; aerial mycelium Light Olive Gray; reverse gray brown; soluble pigment light brown; tyrosine digested.
Skimmed Milk: Slight coagulation and peptonization by 14 days but not at 7; pink-salmon soluble pigment; pH changed quickly from 6.5 to 6.9 and in 14 days was 8.0.
Nitrate Reduction: Nitrites produced strongly after 3 days.
$H_2S$ Production (lead acetate strip test): Positive on peptone iron agar with and without yeast extract and in shaken flasks of cystein HCl, tryptone, peptone, proteose-peptone in 3 days; at 7 days also weakly produced in shaken flasks of $Na_2S_2O_3$.
Melanin: No pigment in Peptone Iron Agar.
Cellulose: No growth.
Carbohydrate Utilization (Pridham and Gottlieb Method): Positive for arabinose, dextrin, fructose, galactose, glucose, glycerol, inositol, inulin, lactose, maltose, raffinose, rhamnose, starch, trehalose, xylose; negative for dulcitol, mannitol, salicin, sorbitol, sucrose, sodium acetate, sorbose.
Spores: On synthetic agar, spores were borne in chains scattered singly or, more often, in a monopodially branching system, 15–50 spores per chain, chains in loops and hooks (RA type); on Gauze's Organic Medium No. 2 chains of RA type were most abundant, but some were flexuous (F type) and some were spiral (S type); spores were swollen-cylindrical with square or slightly rounded ends, mostly 1.0–1.7 × 0.7–1.0 $\mu$ ranging from 1.0 × 0.5 to 2 × 1.0 $\mu$; walls smooth by electron micrography.

That our culture B-105621 was different from *S. violaceorectus* is clear from the listing below of the several properties in which the two strains were not alike on the few media tested:

| Medium | *S. violaceorectus* | B-105621 |
| --- | --- | --- |
| Gauze's No. 1 | (description) Aerial mycelium gray (5A2)* Substrate mycelium violet (45E5)* | Aerial mycelium Gray (30A1)* Substrate mycelium reddish-pink (3K9)* |
| Gauze's No. 2 | Aerial mycelium gray (5A2)* Substrate mycelium gray-brown (8A12)* | Aerial mycelium gray (14A1)* Substrate mycelium reddish-brown (6L9)* |
| Gelatin | Soluble pigment gray-brown Liquefaction rapid | No soluble pigment No liquefaction |
| Morphology | Sporophores straight | Chains of spores mostly loops and hooks; some straight and some spiral |

*Muerz and Paul's Color Guide

A third culture, identified in the culture collection of Chas. Pfizer & Co., Inc. as Isolate B-32828, also produces the same products. This culture appears similar to B-35251 and has been deposited with the American Type Culture Collection under the number *Streptomyces* sp. ATCC 21345.

It is to be understood that for the production of the products described herein according to the present invention, limitation to the aforesaid organisms is not intended. It is especially desired and intended to include mutants produced from these strains of these organisms by various means, such as irradiation with X-rays or ultraviolet light, treatment with nitrogen mustards, single-cell culture techniques, and the like.

We wish also to include any organism, regardless of its appearance or physiological behavior, that may be developed by means of transformation, transduction, genetic recombination, or some other genetical procedure, using a nucleic acid or an equivalent material from the herein-described species, whereby it has acquired the ability to produce the elaboration product here described or to carry on the biochemical change here described.

Antibiotics B-35251A, B-35251B, and B-35251C are remarkably effective in treating a number of infections. For this purpose, the pure materials, or one of the crude forms of the valuable products or mixtures thereof, may be employed. This includes either a filtered fermentation broth prepared from the microorganisms described herein or a solid or liquid concentrate obtained therefrom. Such preparations should be of sufficient potency to provide a daily dose to the host equivalent to at least about 10–500 mg/kg. of body weight of the pure antibiotic. In order to do this, a concentration of the active ingredient in the carrier of at least about 0.001% is necessary. For administration to a living host, a non-toxic carrier, of course, is selected. By non-toxic is meant a carrier which is non-toxic when administered in a quantity sufficient to provide the above dose of antibiotic B-35251A, B-35251B, or B-35251C. This may be either a pharmaceutical carrier, either a liquid or a solid, such as water, aqueous ethanol, syrup, isotenic saline or glucose, starch, lactose, calcium phosphate, etc., an animal feed stuff, or a mixture of various materials as occurs in a filtered fermentation broth. Either oral or parental administration is satisfactory. The parenteral route is perhaps preferred until a satisfactory regimen adapted to the patient is developed.

These novel substances are significantly active against Walker 256 carcinosarcoma in rats, leukemia P-388 in mice, and HeLa cells in tissue culture.

BRIEF DESCRIPTION OF THE DRAWINGS

The accompanying drawing, FIG. 1, illustrates the characteristic infrared absorption spectrum of a typical mixture of B-35251A and B-35251B (approximately 60–40) as obtained by the procedures described herein when determined in a potassium bromide pellet.

DETAILED DESCRIPTION OF THE INVENTION

This invention includes within its scope processes for growing the microorganisms *S. viridochromogenes* ATCC 21343, *S. griseo-laqueus*, ATCC 21344, and *Streptomyces sp.* ATCC 21345. The cultivation of these microorganisms preferably takes place in aqueous nutrient media at a temperature of from about 24°–30° C. and under submerged, aerobic conditions with agitation. Nutrient media which are useful for such purposes include a carbohydrate, such as sugars, starch, glycerol, corn meal; a source of organic nitrogen, such as casein, soybean meal, peanut meal, wheat gluten, cotton seed meal, lactalbumen, enzymatic digest of casein. A source of growth substances, such as distiller's solubles, yeast extract, molasses extract residues; as well as mineral salts, such as sodium chloride, potassium chloride, potassium phosphate, magnesium sulfate; and trace minerals, such as copper, zinc, and iron, may also be utilized with advantageous results. A particularly useful and preferred medium in one containing glucose 1%, soybean meal 1.5%, potassium phosphate dibasic 0.25%, distiller's solubles 0.5%, sodium chloride 0.2%, and calcium carbonate 0.2%. If excessive foaming is encountered during fermentation, antifoam agents, such as vegetable oils, may be added to the fermentation medium. The pH of the fermentation tends to remain rather constant; but, if variations are encountered, a buffering agent, such as calcium carbonate, may also be added to the medium.

Inoculum for the preparation of the herein-described products may be obtained by employing growth from slants of the aforesaid microorganisms on such media as Emerson's agar or beef lactose. The growth may be used to inoculate either shake flasks or inoculum tanks, or, alternatively, the inoculum tanks may be seeded from the shake flasks. The growth of the microorganism usually reaches its maximum in about 2 or 3 days. However, variations in the equipment used, aeration, rate of stirring, and so forth may affect the speed with which the maximum activity is reached. In general, the fermentation is continued until substantial antimicrobial activity is imparted to the medium, a period of from about 1 day to about 3 days being sufficient for most purposes. Progress of the fermentation is followed by standard plate assay methods using *Bacillus subtilis*. In the case of *S. viridochromogenes*, maximum activity is reached at 60–70 hours. *S. griseo-laqueus* achieves maximum activity after 40–50 hours of fermentation. Aeration of the medium in tanks for submerged growth is preferably maintained at the rate of about ½ to 2 volumes of free air per volume of broth per minute. Agitation may be maintained by means of agitators generally familiar to those in the fermentation industry. Aseptic conditions must, of course, be maintained throughout the transfer of the microorganisms and throughout their growth.

The fermentations are characterized by the formation of a bright orange-red pigment which appears to be responsible for the biological activity.

After a satisfactory level of antibiotic activity is attained with the selected culture, the beer is filtered. Filtration of the culture liquid at pH 7 (existing pH) results in some reduction in activity in the broth. This is overcome by adjusting the whole broth to about pH 4 prior to filtration. Antibiotically active components are extracted from the filtrate with a water-immiscible organic solvent, such as preferably n-butanol, chloroform containing 10–15% n-butanol, isopropanol, or, somewhat less satisfactorily, with chloroform, ethyl acetate, benzene, or methylene chloride. n-Butanol is a favored extractant although the quality of the product from this solvent is low because of simultaneous extraction of impurities. Chloroform is a rather weak solvent for this extraction; but addition of other solvents, such as n-butanol or isopropanol, to the extent of 10–15%, improves the extraction, especially in the presence of 10% sodium chloride. The following recovery procedure is preferred: The whole broth is stirred at pH 4 for 30 minutes, then filtered. The filtrate is adjusted to pH 7 and the small amount of gelatinous precipitate which separates is removed by filtration. Sodium chloride is added to the filtrate which is then extracted with chloroform-isopropanol (1:1). The sodium chloride is not necessary but improves the yield on extraction by its salting-out effect. The clear solvent layer is then acidified by treatment with a mineral or organic acid, e.g., acetic acid (0.01% volume) and concentrated to small volume.

Additional amounts of active material are recovered from the mycelial cake by stirring it with methanol for two hours, allowing the suspension to stand for 10-15 hours, then filtering. This process is repeated once more. The combined extracts are concentrated, then extracted with chloroform-isopropanol (9:1) in the presence of 10% salt. The extracts are combined, then concentrated to small volume.

The concentrates from the broth and mycelium can be combined or worked up separately, if desired. However, regardless of whether the concentrates are combined or worked up separately, the following procedure is used for further purification. The concentration is continued until a thick syrup is obtained. The syrup is shaken between about 2 to 5 volumes of a solution consisting of equal volumes of mildly acid aqueous methanol, e.g., 10% methanol containing 1% acetic acid, and isopropyl ether. The aqueous layer is separated and the extraction repeated three more times, using about one-third volume of 10% methanol each time. Most of the activity passes into the aqueous acid layer which is treated with sodium chloride, then extracted with chloroform-isopropanol (9:1). The combined solvent extract is concentrated to near dryness, the residue triturated with isopropyl ether, and the red solid filtered off and dried. Thin layer chromatography of the sample shows about 10-15 orange-red spots. Paper chromatography, followed by bioassay of the chromatogram, shows two major antibiotics close together and two other minor components. The two major components, $R_f$ 0.6 and 0.5, and the minor components, $R_f$ 0.3 and 0.05, are designated as components A, B, C, and D, respectively. If the fermentation is run longer than about 50 hours in the case of *S. griseo-laqueus* ATCC 21344, or longer than about 70 hours in the case of *S. virido-chromogenes* ATCC 21343, the D component predominates. This component is isolated and crystallized. Ultraviolet and infrared spectra and chromatographic comparisons of the pure D component with an authentic sample of daunomycin show that it is identical with the known antibiotic daunomycin.

For the purification of the more active components A and B, several methods involving countercurrent distribution or chromatography are available. It is noted first that all four of the bioactive components are weakly basic, and, when hydrolyzed by acid, they produce neutral, red, inactive substances. Chromatography on alumina, Florisil (an activated magnesium silicate available from the Floridin Co.), or silicic acid is not satisfactory because the compounds are either not eluted or eluted with no improvement in purity. Hence, use is made chiefly or partition chromatography or cellulose or its derivatives. Carboxymethyl cellulose absorbs the active material from aqueous solutions and releases it upon elution with 1-4% chloride. Components A and B are eluted more easily than daunomycin. Neutral components are not absorbed. This method can be used for preliminary separation of some crude samples. Among systems suitable for countercurrent distribution are the following two:

1. n-Butanol, ethyl acetate, 1% aqueous acetic acid (1:3:4).

2. Ethanol, chloroform, 0.2% aqueous acetic acid (15:85:100).

In both systems, daunomycin favors the aqueous phase. The neutral substances favor the solvent phase, and components A and B move to intermediate positions. In system 1, with 100 transfers, daunomycin is in tubes 10-20, components A, B, and C from tubes 25-60, and the neutral substances 80-100. In system 2, with 100 transfers, neutral substances remain in tubes 0-15, components A and B in tubes 20-60, and daunomycin in tubes 80-100. The compound can be recovered from the corresponding tubes by concentration of the solvent, trituration with ether, and filtration. The red solid represents the acetic acid salt. By this method, a mixture of components A and B can be obtained nearly free from the others, and the activity is shown in the dose range 8-20γ/kg. against W-256.

Partition chromatography offers more convenient procedures for the purification of components A and B. Two procedures can be used. In both cases, it is better to use carboxymethyl cellulose as supporting medium instead of cellulose. In the first system, 1 liter of 1% acetic acid is shaken with o10 liters of a mixture of ethyl acetate and n-butanol (92:8) and the layers separated. Carboxymethyl cellulose (100 g.) is stirred in about 5 liters of the solvent phase while 60 ml. of the aqueous phase is added. The slurry is poured into a column (2 inch diameter) and packed by pressure. The sample (1-3 g.) is shaken between 6 ml. of aqueous layer and 300 ml. of solvent layer until solution is complete. Carboxymethyl cellulose (10 g.) is added, the mixture shaken until uniform, then added to the column which is developed with the equilibrated solvent phase. The neutral and weakly basic components are eluted first, followed by components A and B, then C, and finally D. For the last two components, the percentage of n-butanol is raised from 8 to 12 for a speedy elution. The fractions are followed by optical density at 250 μ as well as activity against *B. subtilis*. The active fractions are combined, concentrated to dryness, and the solid filtered with the help of ether. Two successive applications of this procedure yield a highly purified mixture of components A and B with activity in the dose range 5-10 γ/kg. against W-256.

In the second, more convenient, procedure, the system is made by shaking 1 liter of 0.2% aqueous acetic acid with 5 liters of benzene and 5 liters of chloroform. The layers are separated. To the solvent layer is added 1 liter of 3A ethanol (95% ethanol containing 5% commercial methanol). The rest of the procedure is the same as that described above. The column is made by equilibrating 100 g. of carboxymethyl cellulose in 5-6 liters of solvent layer with 60 ml. of aqueous layer and packing the column with pressure. The sample application is the same as before. Components A and B emerge close together, whereas C and D remain more strongly absorbed. A repetition of the procedure gives a highly purified mixture of A and B active in the dose range 4-8 γ/kg. against W-256. In this column, the B component is eluted first and then the A component.

Components A and B are highly sensitive to the environment. In solution, they undergo transformations to yield other uncharacterized products. It appears that component A is converted into component B in solution. This is shown by separating the two by paper chromatography, eluting the two, and rechecking by paper chromatography. The A component shows both fractions. Also, freshly made solutions compared with two or three-day solutions in methanol show this tendency when tested by paper chromatography.

Because of the close similarity of the two components and of the possibility of interconversion, a highly purified mixture of the two components, referred to as mitocromin, is used for pharmacological studies.

The properties of such a mixture consisting of about 60% component A and 40% component B as their acetate salts are given below.

TABLE I

PROPERTIES OF MITOCROMIN ACETATE SALT

| | |
|---|---|
| Appearance: | Brick-red amorphous solid |
| Melting Point: | 169–173° C. (dec.) |

| Ultraviolet Spectrum | λ max. | $E_{1\,cm.}^{1\%}$ |
|---|---|---|
| (in methanol) | 232 | 452 |
| | 252 | 327 |
| | 289 | 113 |
| (in water) | 232 | 486 |
| | 252 | 828 |
| | 289 | 122 |
| (in 0.1N NaOH/CH$_3$OH) | 235 | 380 |
| | 248 | 390 |
| | 290(sh) | 94 |

| | |
|---|---|
| Infrared Spectrum (KBr pellet) Figure 1 | maxima at: 2.95, 3.40, 5.85, 6.19, 6.31, 7.09, 7.25, 7.40, 7.79, 8.11, 8.25, 8.95, 9.13, 9.32, 9.62, 9.85μ |
| Analysis: | 55.60% C; 6.97% H; 2.32% N. |
| Paper Chromatography | |
| Stationary phase: | Whatman No. 4 paper impregnated with acetone-water (7:3) |
| Mobile phase: | Benzene-chloroform-acetic acid-water (2:2:1:1) |
| R$_f$ | Component A  0.35<br>Component B  0.25<br>Other (minor amount)  0 |
| Solubility | Very soluble in methanol, ethanol water, 0.1N HCl, 0.1NaOH<br><br>Soluble in chloroform<br><br>Slightly soluble in ethylacetate, acetone<br><br>Insoluble in benzene |

In acid solutions, mitocromin forms an orange solution and in basic solutions a blue-purple solution.

The basic nature of the products B-35251A, B-35251B, and B-35251C affords the preparation of acid addition salts. The antibiotics appear somewhat unstable in strong acids, such as mineral acids, e.g., hydrochloric, sulfuric, and nitric acids, but are stable in weak organic acids with which they readily form salts. Typical of such acids are acetic, propionic, butyric, citric, tartaric, maleic, malic, fumaric, benzoic, glycolic, gluconic, gulonic, succinic, arylsulfonic, e.g., p-toluenesulfonic acid, and the like. Such salts are formed by standard procedures known to those skilled in the art.

The antitumor and antileukemic activity of mitocromin is presented below in Tables II and III, respectively.

TABLE II

ANTITUMOR ACTIVITY OF MITOCROMIN AGAINST W-256 CARCINOSARCOMA[c]

| Dosage (mg./kg.) | Route[a] | Regimen[b] | Survival Rate | Percent of Control (T/C) |
|---|---|---|---|---|
| 0.01 | I.P. | Days 3–6 | 5/6 | 8 |
| 0.008 | I.P. | Days 3–6 | 5/6 | 28 |
| 0.006 | I.P. | Days 3–6 | 5/6 | 42 |
| 0.004 | I.P. | Days 3–6 | 6/6 | 32 |
| 0.01 | I.P. | Days 3–6 | 5/6 | 22 |
| 0.0075 | I.P. | Days 3–6 | 6/6 | 28 |
| 0.005 | I.P. | Days 3–6 | 6/6 | 41 |
| 0.0025 | I.P. | Days 3–6 | 6/6 | 74 |
| 0.01 | I.P. | Days 3–6 | 6/6 | 31 |
| 0.0075 | I.P. | Days 3–6 | 6/6 | 65 |
| 0.005 | I.P. | Days 3–6 | 6/6 | 57 |
| 0.0025 | I.P. | Days 3–6 | 6/6 | 63 |
| 0.02 | I.P. | Days 3–6 | 4/6 | 11 |
| 0.015 | I.P. | Days 3–6 | 5/6 | 22 |
| 0.010 | I.P. | Days 3–6 | 6/6 | 27 |
| 0.005 | I.P. | Days 3–6 | 6/6 | 62 |
| 0.02 | I.P. | Days 3–6 | 5/6 | 4 |
| 0.01 | I.P. | Days 3–6 | 6/6 | 28 |
| 0.0075 | I.P. | Days 3–6 | 5/6 | 18 |
| 0.005 | I.P. | Days 3–6 | 6/6 | 67 |
| 0.012 | I.P. | Days 3–6 | 5/6 | 18 |
| 0.009 | I.P. | Days 3–6 | 4/6 | 26 |
| 0.006 | I.P. | Days 3–6 | 6/6 | 29 |
| 0.004 | I.P. | Days 3–6 | 6/6 | 45 |
| 0.012 | I.P. | Days 3–6 | 2/6 | 8 (Toxic) |
| 0.009 | I.P. | Days 3–6 | 6/6 | 15 |
| 0.006 | I.P. | Days 3–6 | 5/6 | 15 |
| 0.004 | I.P. | Days 3–6 | 6/6 | 39 |
| 0.01 | I.P. | Days 3–6 | 6/6 | 21 |
| 0.008 | I.P. | Days 3–6 | 6/6 | 33 |
| 0.006 | I.P. | Days 3–6 | 6/6 | 54 |
| 0.004 | I.P. | Days 3–6 | 6/6 | 72 |
| 0.002 | I.P. | Days 3–6 | 6/6 | 90 |
| 0.01 | S.C. | Days 3–6 | 6/6 | 90 |
| 0.0075 | S.C. | Days 3–6 | 6/6 | 89 |
| 0.005 | S.C. | Days 3–6 | 6/6 | 81 |

TABLE II—Continued

ANTITUMOR ACTIVITY OF MITOCROMIN AGAINST W-256 CARCINOSARCOMA[c]

| Dosage (mg./kg.) | Route[a] | Regimen[b] | Survival Rate | Percent of Control (T/C) |
|---|---|---|---|---|
| 0.0025 | S.C. | Days 3–6 | 6/6 | 98 |
| 0.10 | S.C. | Days 3–6 | 1/6 | 5 (Toxic) |
| 0.05 | S.C. | Days 3–6 | 6/6 | 14 |
| 0.01 | S.C. | Days 3–6 | 6/6 | 68 |
| 0.07 | S.C. | Days 3–6 | 6/6 | 37 |
| 0.06 | S.C. | Days 3–6 | 6/6 | 43 |
| 0.05 | S.C. | Days 3–6 | 6/6 | 53 |
| 0.04 | S.C. | Days 3–6 | 6/6 | 47 |
| 0.03 | S.C. | Days 3–6 | 5/6 | 65 |
| 0.08 | S.C. | Days 3–6 | 3/6 | 2 (Toxic) |
| 0.06 | S.C. | Days 3–6 | 5/6 | 19 |
| 0.04 | S.C. | Days 3–6 | 6/6 | 57 |
| 0.02 | S.C. | Days 3–6 | 6/6 | 84 |
| 0.01 | I.M. | Days 3–6 | 6/6 | 64 |
| 0.0075 | I.M. | Days 3–6 | 6/6 | 63 |
| 0.005 | I.M. | Days 3–6 | 6/6 | 79 |
| 0.0025 | I.M. | Days 3–6 | 6/6 | 60 |
| 0.10 | I.M. | Days 3–6 | 0/6 | Toxic |
| 0.05 | I.M. | Days 3–6 | 6/6 | 1 |
| 0.01 | I.M. | Days 3–6 | 6/6 | 38 |
| 0.10 | I.M. | Days 3–6 | 5/6 | 4 |
| 0.08 | I.M. | Days 3–6 | 3/6 | 23 (Toxic) |
| 0.06 | I.M. | Days 3–6 | 4/6 | 40 |
| 0.04 | I.M. | Days 3–6 | 4/6 | 43 |
| 0.02 | I.M. | Days 3–6 | 6/6 | 74 |
| 0.08 | I.M. | Days 3–6 | 5/6 | 20 |
| 0.06 | I.M. | Days 3–6 | 6/6 | 14 |
| 0.04 | I.M. | Days 3–6 | 2/6 | 45 (Toxic) |
| 0.02 | I.M. | Days 3–6 | 4/6 | 71 |
| 0.1 | P.O. with fast | Days 3–6 | 3/6 | 60 (Toxic) |
| 0.05 | P.O. with fast | Days 3–6 | 6/6 | 75 |
| 0.01 | P.O. with fast | Days 3–6 | 6/6 | 93 |
| 0.015 | I.P. | Days 3,5,7 EOD | 6/6 | 27 |
| 0.01 | I.P. | Days 3,5,7 EOD | 6/6 | 36 |
| 0.005 | I.P. | Days 3,5,7 EOD | 6/6 | 63 |
| 0.04 | I.P. | Days 3,5,7 EOD | 3/6 | 25 (Toxic) |
| 0.03 | I.P. | Days 3,5,7 EOD | 3/6 | 9 (Toxic) |
| 0.02 | I.P. | Days 3,5,7 EOD | 6/6 | 16 |
| 0.01 | I.P. | Days 3,5,7 EOD | 6/6 | 77 |
| 0.04 | I.P. | Days 3,5,7 EOD | 5/6 | 21 |
| 0.02 | I.P. | Days 3,5,7 EOD | 6/6 | 18 |
| 0.01 | I.P. | Days 3,5,7 EOD | 6/6 | 57 |
| 0.05 | I.P. | Day 3 Only | 6/6 | 21 |
| 0.01 | I.P. | Day 3 Only | 6/6 | 110 |
| 0.15 | I.P. | Day 3 Only | 1/6 | 42 (Toxic) |
| 0.10 | I.P. | Day 3 Only | 3/6 | 44 (Toxic) |
| 0.05 | I.P. | Day 3 Only | 3/6 | 20 (Toxic) |
| 0.007 | I.P. | Days 1–6 | 0/6 | Toxic |
| 0.005 | I.P. | Days 1–6 | 4/6 | 53 |
| 0.002 | I.P. | Days 1–6 | 6/6 | 119 |
| 0.001 | I.P. | Days 1–6 | 6/6 | 70 |
| 0.08 | I.M. | b.i.d. | 2/6 | 12 (Toxic) |
| 0.06 | I.M. | b.i.d. | 2/6 | 18 (Toxic) |
| 0.04 | I.M. | b.i.d. | 5/6 | 24 |
| 0.02 | I.M. | b.i.d. | 6/6 | 14 |
| 0.01 | I.M. | b.i.d. | 6/6 | 41 |
| 0.075 | I.M. | b.i.d. | 6/6 | 0 |
| 0.05 | I.M. | b.i.d. | 6/6 | 20 |
| 0.04 | I.M. | b.i.d. | 6/6 | 45 |
| 0.02 | I.M. | b.i.d. | 6/6 | 72 |
| 0.01 | I.M. | b.i.d. | 6/6 | 68 |
| 0.10 | I.M. | b.i.d. | 0/6 | Toxic |
| 0.08 | I.M. | b.i.d. | 1/6 | 11 (Toxic) |
| 0.06 | I.M. | b.i.d. | 5/6 | 20 |
| 0.04 | I.M. | b.i.d. | 5/6 | 21 |
| 0.02 | I.M. | b.i.d. | 6/6 | 45 |
| 0.008 | I.P. | b.i.d. | 0/6 | Toxic |
| 0.006 | I.P. | b.i.d. | 0/6 | Toxic |
| 0.004 | I.P. | b.i.d. | 5.6 | 2 |
| 0.002 | I.P. | b.i.d. | 5/6 | 26 |
| 0.006 | I.P. | b.i.d. | 6/6 | 20 |
| 0.004 | I.P. | b.i.d. | 6/6 | 47 |
| 0.002 | I.P. | b.i.d. | 6/6 | 64 |
| 0.001 | I.P. | b.i.d. | 6/6 | 107 |
| 0.005 | I.P. | b.i.d. | 6/6 | 94 |
| 0.08 | S.C. | b.i.d. | 5/6 | 18 |
| 0.06 | S.C. | b.i.d. | 6/6 | 19 |
| 0.04 | S.C. | b.i.d. | 6/6 | 70 |
| 0.02 | S.C. | b.i.d. | 6/6 | 66 |
| 0.10 | S.C. | b.i.d. | 2/6 | 8 (Toxic) |
| 0.08 | S.C. | b.i.d. | 3/6 | 12 (Toxic) |
| 0.06 | S.C. | b.i.d. | 6/6 | 36 |
| 0.04 | S.C. | b.i.d. | 6/6 | 47 |
| 0.02 | s.c. | b.i.d. | 6/6 | 117 |

[a] I.P. = intraperitoneal; S.C. = subcutaneous;
I.M. = intramuscular; P.O. = oral.
[b] b.i.d. = twice a day.
[c] Cancer Chemotherapy 25, 12 and 15 (1962) and Revision of July, 1964.

Mitocromin is thus highly effective on W-256 carcinosarcoma when administered twice daily by the intraperitoneal or intramuscular routes. It shows significant, although quantitatively less, activity when administered by the other parenteral routes and regimens studied.

It is also highly active in leukemia P-388 when administered intraperitoneally on day 1 only, on days 1–10, twice daily on days 1–10, on every other day (EOD), and on every third day (E3D) bases as is evident from Table III.

TABLE III

ACTIVITY OF MITOCROMIN AGAINST P-388 LEUKEMIA*

| Dosage (mg./kg.) | Route | Regimen | Survival Rate | Percent of Control (T/C) |
|---|---|---|---|---|
| 0.008 | I.P. | Days 1–10 | 6/6 | 172 |
| 0.004 | I.P. | Days 1–10 | 6/6 | 150 |
| 0.002 | I.P. | Days 1–10 | 6/6 | 145 |
| 0.001 | I.P. | Days 1–10 | 6/6 | 118 |
| 0.016 | I.P. | Days 1–10 | 4/6 | 45 (Toxic) |
| 0.012 | I.P. | Days 1–10 | 5/6 | 68 (Toxic) |
| 0.008 | I.P. | Days 1–10 | 6/6 | 140 |
| 0.004 | I.P. | Days 1–10 | 6/6 | 163 |
| 0.002 | I.P. | Days 1–10 | 6/6 | 159 |
| 0.001 | I.P. | Days 1–10 | 6/6 | 136 |
| 0.008 | I.P. | Days 1–10 | 6/6 | 175 |
| 0.006 | I.P. | Days 1–10 | 6/6 | 155 |
| 0.004 | I.P. | Days 1–10 | 6/6 | 155 |
| 0.002 | I.P. | Days 1–10 | 6/6 | 175 |
| 0.008 | I.P. | b.i.d. | 6/6 | 190 |
| 0.006 | I.P. | b.i.d. | 6/6 | 170 |
| 0.004 | I.P. | b.i.d. | 6/6 | 185 |
| 0.002 | I.P. | b.i.d. | 6/6 | 150 |
| 0.01 | S.C. | Days 1–10 | 6/6 | 120 |
| 0.0075 | S.C. | Days 1–10 | 6/6 | 110 |
| 0.005 | S.C. | Days 1–10 | 6/6 | 100 |
| 0.01 | I.M. | Days 1–10 | 6/6 | 110 |
| 0.0075 | I.M. | Days 1–10 | 6/6 | 100 |
| 0.005 | I.M. | Days 1–10 | 6/6 | 110 |
| 0.1 | I.P. | Day 1 Only | 0/6 | 40 (Toxic) |
| 0.05 | I.P. | Day 1 Only | 5/6 | 115 |
| 0.01 | I.P. | Day 1 Only | 6/6 | 150 |
| 0.05 | I.P. | EOD | 0/6 | 50 |
| 0.025 | I.P. | EOD | 6/6 | 80 (Toxic) |
| 0.010 | I.P. | EOD | 6/6 | 195 |
| 0.005 | I.P. | EOD | 6/6 | 210 |
| 0.075 | I.P. | E3D | 0/6 | 40 |
| 0.050 | I.P. | E3D | 0/6 | 50 |
| 0.025 | I.P. | E3D | 6/6 | 90 |
| 0.010 | I.P. | E3D | 6/6 | 185 |

*Burchenal et al., Cancer 2, 113 (1949).

The $LD_{50}$ of mitocromin in mice is presented in Table IV.

TABLE IV

TOXICITY OF MITOCROMIN IN MICE

| Route | No. of Doses | $LD_{50}$ (mg./kg.)** Male | Female | Average $LD_{50}$ Combined Sex |
|---|---|---|---|---|
| I.P. | 1 | 0.012 | 0.015 | 0.013 |
| P.O. | 1 | 1.490 | 1.710 | 1.600 |
| I.V. | 1 | 0.058 | 0.051 | 0.054 |
| I.P. | 5 | 0.003 | 0.003 | 0.003 |
| P.O. | 5 | 0.490 | 0.490 | 0.490 |

**$LD_{50}$ = dose which is toxic to 50% of the mice.

Mitocromin is an active, broad-sectrum antibiotic as the data in Table IV, obtained by standard in vitro serial dilution tests in brain-heart infusion broth, show. It is especially active against Gram-positive organisms. Its activity against tetracycline-resistant S. aureus 400 is especially interesting. Although the degree of activity against Gram-negatives is less than that against Gran-positives, its degree of activity and spectrum make mitrocromin of interest as a disinfectant against such microorganisms, as an aid in purifying mixed cultures for medical diagnostic and biological research purposes.

TABLE IV

ANTIBACTERIAL SPECTRUM OF MITOCROMIN

| Organism | MIC, mcg./ml.** |
|---|---|
| Staphylococcus aureus | 0.045 |
| Staphylococcus aureus 400* | 0.02 |
| Streptococcus pyogenes | < 0.01 |
| Streptococcus faecalis | 0.19 |
| Diplococcus pneumoniae | < 0.01 |
| Aerobacter aerogenes | 3.12 |
| Escherichia coli | 3.12 |
| Proteus vulgaris | 25 |
| Pseudomonas aeruginosa | 12.5 |
| Salmonella typhosa | 3.12 |
| Klebsiella pneumoniae | 1.56 |
| Vibrio comma | 1.56 |
| Pasteurella multocida | 0.78 |
| Shigella sonnei | 1.56 |
| Proteus mirabilis | 12.5 |

**Minimum concentration at which growth of the organism failed to occur.
*Tetracylcine resistant.

The following examples are provided to illustrate specific processes for preparation of antibiotics B-35251A, B-35251B, B-35251C, and daunomycin and the separation thereof. They are provided for illustrative purposes only and are not intended to limit the scope of the invention. EXAMPLE 1

A nutrient medium is prepared from the following materials in one liter of water:

| | | |
|---|---|---|
| Glucose | 10 | g. |
| Soybean meal | 15 | g. |
| Distiller's solubles | 5 | g. |
| Potassium phosphate dibasic | 2.5 | g. |

| | | |
|---|---|---|
| Sodium chloride | 2 | g. |
| Calcium carbonate | 2 | g. |

A slant culture of *S. viridochromogenes* ATCC 21343 is transferred to 100 ml. of this medium in a 300 ml. Erlenmeyer flask and shaken 48 hours until good growth is obtained. Inoculum for a larger fermentation is prepared by transferring the contents of the aforesaid flask under sterile conditions to one liter of the same medium in a 3-liter flask and shaking the same for 48 hours.

Fifty gallons of sterile nutrient medium having the above-described composition is prepared and then inoculated with inoculum thus prepared. The temperature is maintained at 28° C. and the broth stirred and aerated at the rate of 1 volume of air per volume of broth per minute. After 48 hours, the whole broth is adjusted to pH 4, stirred for 30 minutes, then filtered. The filtrate is adjusted to pH 7, the small amount of gelatinous precipitate which separates is removed by filtration, and enough sodium chloride added to make a 10% solution. The broth is then extracted with 50 gallons of 9:1 chloroform-isopropanol, the clear solvent layer treated with acetic acid to the extent of 0.01%, then concentrated to a small volume (0.5–1 gallon).

The mycelial cake contains additional amounts of active material which is recovered by stirring the cake with methanol (10 gallons) for 2 hours, allowing the mixture to stand for 10–15 hours, then filtering. This process is repeated once more. The combined extracts are concentrated to about 5 gallons, the concentrate then extracted with 2 × 2 gallon portions of 9:1 chloroform-isopropanol in the presence of 10% salt. The combined solvent layers are then concentrated to about 0.5 gallon.

EXAMPLE 1

The concentrate from the broth and mycelium can be combined or worked up separately. The concentration is continued until a thick syrup is obtained. This concentrate is shaken between 5 liters of 10% methanol containing 1% acetic acid and 5 liters of isopropyl ether. The aqueous layer is separated and the extraction continued three more times using 3 liters of the 10% methanol each time. Most of the activity passes into the aqueous acid layer which is then treated with sodium chloride (to make a 10% solution) and extracted twice with 9:1 chloroform-isopropanol (2 liters each time). The combined solvent extract is concentrated to near dryness and the residue triturated with isopropyl ether. The red solid, a mixture of all four compounds, is filtered and dried. Depending on the quality of the broth, the activity of this sample is shown at a dose of 0.1–0.2 mg./kg. in Walker 256. Paper chromatography, using benzene-chloroform-acetic acid-water (2:2:1:1) as the mobile phase and Whatman No. 4 paper impregnated with acetone-water (7:3) as the stationary phase followed by bioassay of the sheet, shows two major antibiotics close together and two other minor components. The two major components, $R_f$ 0.45 and 0.35, and the minor components, $R_f$ 0.3 and 0.05, are designated as components B-35251A, B-35251B, B-35251C, and B-35251D (daunomycin), respectively.

The red solid is purified by countercurrent distribution in the system: n-butanol-ethyl acetate-1% aqueous acetic acid (1:3:4). To this system, with 100 transfers, daunomycin is in tubes 10–20, components A, B, and C from tubes 25–60, and the neutral substances 80–100. The product, essentially a mixture of the acetate salts of B-35251A and B-35251B plus a small amount of B-325251C, is recovered from the corresponding tubes by concentration of the solvent, trituration with ether, and filtration. The mixture of components A and B obtained is nearly free from the other components and shows activity in the dose range 8–20 γ/kg. against W-256.

EXAMPLE II

The procedure of Example I is repeated but the red solid is purified by partition chromatography rather than by countercurrent distribution. The red solid is divided into two equal portions, one of which is purified by Method A, the other by Method B.

Method A

In this method, 1% aqueous acetic acid (500 ml.) is shaken with 5 liters of a mixture of ethyl acetate and n-butanol (92:8) and the layers separated. Carboxymethyl cellulose (50 g.) is stirred in about 2.5 liters of the solvent phase while 30 ml. of the aqueous phase is added. The slurry is panned into a column (2 inches diameter) and packed by pressure. The sample (1 g.) is shaken between 3 ml. of aqueous layer and 300 ml. of solvent layer until solution is complete. Carboxymethyl cellulose (5 g.) is added, the mixture shaken until uniform, then added to the column which is developed with the equilibrated solvent phase. The neutral and weakly basic components are eluted first, followed by components A and B, then C, and finally D. For the last two components, the percentage of n-butanol is raised from 8 to 12 for a speedy elution. The fractions are followed by optical density at 250Mµ as well as activity against *B. subtilis*. The active fractions are combined, concentrated to dryness, and the solid filtered with the help of ether. Two successive applications of this procedure yield a highly purified mixture of components A and B as their acetate salts with activity in the dose range 5–10 γ/kg. against W-256.

EXAMPLE II

Method B

In this method, which is more convenient, the system is made by shaking 500 ml. of 0.2% aqueous acetic acid with 2.5 liters of benzene and 2.5 liters of chloroform. The layers are separated. To the solvent layer is added 500 ml. of 3A ethanol. The rest of the procedure is the same as in Method A. The column is made by equilibrating 50 g. of carboxymethyl cellulose in 2.5–3 liters of solvent layer with 30 ml. of aqueous layer and packing the column with pressure. The sample application is the same as in Method A. Components A and B as acetate salts emerge together, whereas C and D remain more strongly absorbed. Repetition of the procedure gives a highly purified mixture of A and B active in the dose range 4–8 γ/kg. against W-256.

EXAMPLE III

The procedure of Example II, Method B, is repeated but using a fermentation broth produced by *S. griseolaqueus* ATCC 21344. The product is a mixture of about 60% component A and 40% component B.

EXAMPLE IV

The procedure of Example I is repeated but using

*Streptomyces* sp. ATCC 21345 in place of *S. viridochromogenes*. The product obtained is similar to the product of Example I.

EXAMPLE V

The procedure of Example III is repeated but the product isolated by countercurrent distribution in the system ethanol-chloroform-0.2% aqueous acetic acid (15:85:100) in place of the system of Example II, Method B. With 100 transfers, neutral substances are in tubes 0–15, components A and B in tubes 20–60, and daunomycin in tubes 80–100. The product is identical to that of Example III.

EXAMPLE VI

SALT FORMATION

The product of Example III is dissolved in water, the acetic acid neutralized by the careful addition of dilute aqueous sodium hydroxide, and the free base forms of components A and B extracted with chloroform-isopropanol (9:1). The extract is then treated with a methanolic solution containing a stoichiometric amount of the desired acid. The mixture is stirred for one hour and the product recovered by filtration or, if no precipitate forms, by evaporation of the solvent.

In this way, the following acid addition salts are formed: citrate, tartrate, glycolate, maleate, fumarate, malate, benzoate, propionate, p-toluenesulfonate, succinate, and gluconate.

What is claimed is:

1. A process for the production of the antibiotic mitocromin which comprises cultivating a microoorganism of the genus Streptomyces selected from the group consisting of *Streptomyces viridochromogenes* ATCC No. 21343, *Streptomyces griseo-laqueus* ATCC No. 21344, and Streptomyces sp. ATCC No. 21345 in an aqueous nutrient medium under submerged aerobic conditions until substantial antibiotic activity against B. subtilis is imparted to said medium.

2. A product selected from the group consisting of mitocromin and the addition salts thereof with weak organic acids selected from the group consisting of acetic, propionic, butyric, citric, tartaric, maleic, malic, fumaric, benzoic, glycolic, gluconic, gulonic, succinic, and arylsulfonic, said mitocromin being a mixture of basic substances capable of forming salts with acids, which in the acetate salt form is a brick-red amorphous solid and which melts at 169°–173°C., which substance is very soluble in methanol, ethanol, water, dilute hydrochloric acid, and dilute sodium hydroxide, soluble in chloroform, slightly soluble in ethyl acetate and acetone, and insoluble in benzene and which contains the elements carbon, hydrogen, nitrogen, and oxygen in the following percentages by weight:

| | |
|---|---|
| carbon | 55.60% |
| hydrogen | 6.97% |
| nitrogen | 2.32% |
| oxygen (by difference) | 35.11% | and which displays untraviolet absorption maxima in methanol solution at 232, 252, and 289M$\mu$, in water at 232, 252, and 289M$\mu$, and in 0.1N sodium hydroxidemethanol solution at 235, 248, and 290M$\mu$, and which as a 0.03% dispersion in potassium bromide exhibits absorption maxima in the infrared region of the spectrum at 2.95, 3.40, 5.85, 6.19, 6.31, 7.09, 7.25, 7.40, 7.79, 8.11, 8.25, 9.13, 9.32, 9.62, and 9.85 $\mu$, which substance upon paper chromatography in the system benzene-chloroform-acetic acid-water (2:2:1:1) on Whatman No. 4 paper impregnated with acetone-water (7:3) exhibits $R_f$ values of 0.35, 0.25 and 0.

* * * * *